Aug. 30, 1927.
G. A. KLIMEK
1,640,608
HYDRAULIC POWER TRANSMITTER
Filed Feb. 6, 1925
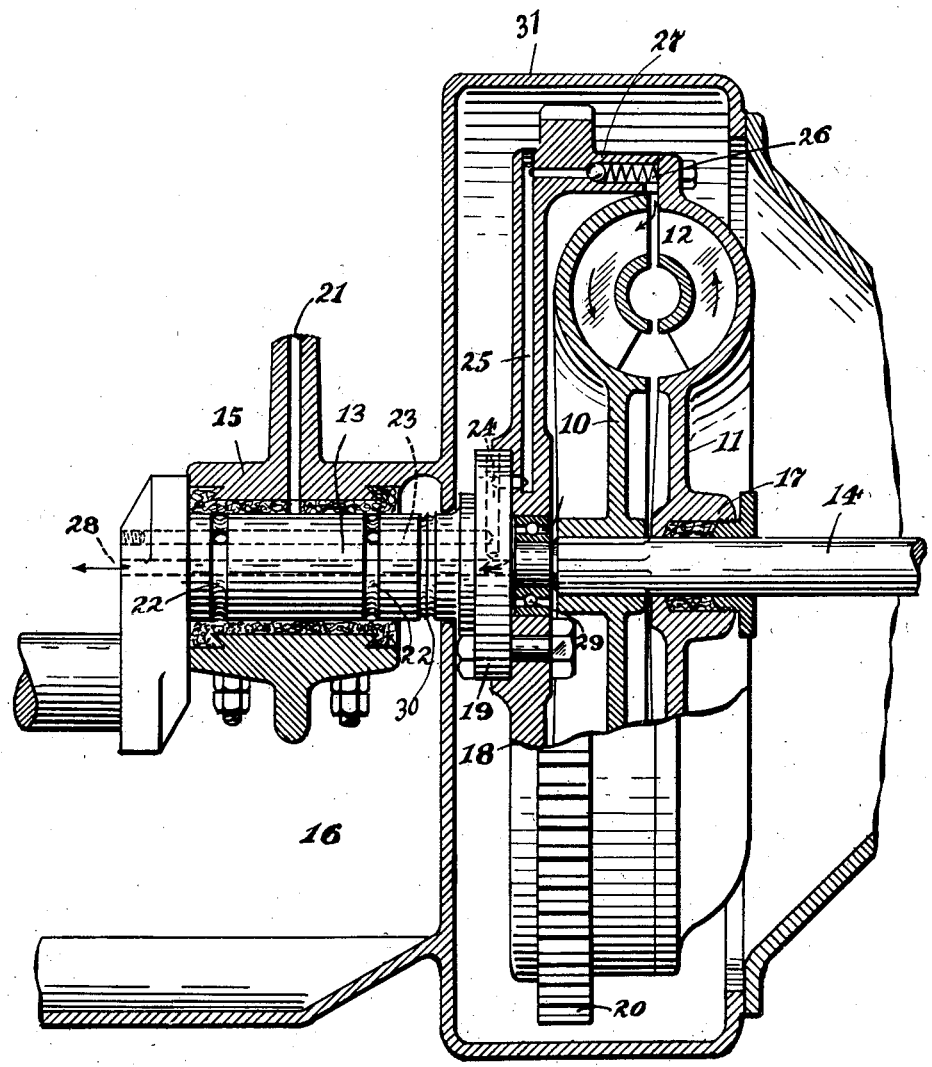
INVENTOR
Gustav A. Klimek
BY
ATTORNEYS Patented Aug. 30, 1927.

1,640,608

UNITED STATES PATENT OFFICE.

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE.

HYDRAULIC POWER TRANSMITTER.

Application filed February 6, 1925. Serial No. 7,210.

This invention relates to that type of hydraulic power transmitter or fluid clutch in which a pair of driving and driven members are each provided with an annular series of vanes, blades or passages, and the two members are so designed and so juxtaposed that the liquid in said passages causes the rotation of the driven member upon rotation of the driving member. Such a construction is shown and broadly claimed in the Föttinger Patent 1,199,359 of September 26th, 1916.

In apparatus of this general type the members themselves, or attachments thereto or supplemental members, form a casing for the liquid which acts to transmit the rotary movement from one member to the other. The passages or the spaces between the vanes or blades are included in the liquid chamber. Efficient operation is dependent in part upon the presence of a predetermined amount of such liquid in the casing, while high pressure under heavy load, centrifugal force at high speed, poor packing or other sealing means around one or both shafts, and other factors, tend to cause or permit leakage from the casing.

The main object of my invention is to provide a simple, automatically acting means for delivering liquid to the casing at all times during normal operation, and without the use of any additional or supplemental liquid pumping or circulating mechanism.

I preferably use as the operating liquid in the transmitter or clutch, lubricating oil of the same general type as that employed in lubricating the main bearings of the machine or mechanism, the power of which is transmitted through the power transmitter.

As a feature of my invention I incorporate the power transmitter in the lubricating oil circulating system of the machine which is coupled to and drives or is driven by the transmitter.

In its preferred embodiment a bearing of a shaft connected to one of the main members is connected to the interior of the power transmitter in such a way that the oil after lubricating the bearing is conducted to the liquid chamber of the transmitter. This oil may serve merely to make up for leakage from the liquid chamber, and preferably all such oil escaping by leakage or otherwise is conducted back to the main oil circulating system.

If the apparatus be used for transmitting power from an internal combustion engine the oil from a main bearing of the crank shaft of the engine, instead of passing directly to the crank shaft, may be conducted to the liquid chamber of the transmitter and the leakage or excess from the latter returned to the crank case. Thus the liquid chamber of the power transmitter forms a part of a loop in the oil circulating system.

In the accompanying drawings I have illustrated one embodiment of my invention, the drawing showing a central longitudinal section through a power transmitter, and a portion of an engine connected thereto.

In the construction illustrated the power transmitter includes a pair of members 10 and 11 each having a series of blades 12 spaced to form an annular liquid circulating chamber, the inlet of the passages in one member being opposed to the outlets of the passages in the other member. One member serves as the driving member or fluid impeller and the other as the driven member or turbine rotor, and each is connected to a shaft for the received or delivered power. As shown, the member 11 constitutes the driving member and is connected to a shaft 13 while the member 10 serves as the driven member and is connected to a shaft 14. The shaft 13 may be the main crank shaft of an internal combustion engine, and may be mounted in a main bearing 15 in the crank case 16. The driving member 11 forms a part of a closed casing and has its center portion provided with a stuffing box 17 through which the shaft 14 passes while its periphery is connected to a cup-shaped casing member 18. This casing member is connected at its center portion to a flange 19 on the crank shaft 13 and may have its periphery provided with a gear 20. This gear may transmit power from the engine independently of the transmission through the fluid, as for instance to drive a water or oil pump or electric generator, or it may serve solely as a part of the gearing connection to an engine starter.

In carrying out my invention the bearing 15 for the crank shaft is provided with suitable means for the delivery of lubricating oil thereto. This is shown as an oil passage 21 leading to the interior of the bearing at a point intermediate the ends of the latter, and from an oil pump or any suitable forced feeding mechanism. Instead of letting the oil escape directly to the crank case at the ends of the bearing I provide the shaft with a pair of oil collecting grooves 22 adjacent the ends thereof, and connect these grooves to an oil passage 23 extending lengthwise of the shaft. This passage is closed at one end and at the other end connects through passages 24 and 25 to an outlet 26. The passage 25 leads through the wall of the casing member 18 and the outlet 26 delivers into the interior of the fluid circulating system of the power transmitter. It is evident that centrifugal force will act on the liquid in the passage 25 to cause the outward flow of the latter and withdraw the oil from the collecting grooves 22. If desired the passage 25 may be provided with a spring-pressed valve 27 and the pressure of the spring so regulated as to control the flow from the bearing to the transmitter but prevent return flow. The liquid delivered from the bearing will thus serve to maintain the transmitter filled to the desired extent and take care of any leakage or loss from the liquid chamber.

Preferably means are provided for the return of excess liquid from the transmitter to the crank case of the engine. As shown, the shaft 13 has a central passage 28 therethrough, one end delivering into the crank case and the other end leading from the interior of the power transmitter. As shown, the end of the shaft 14 is mounted in a ball bearing 29 supported by the casing wall 18 and the passage 28 leads to a point opposite to the end of the shaft 14. Thus the liquid which escapes from the annular chamber including the vanes 12 to the space between the driven member 10 and the casing member 18, may flow through the bearing 29 to lubricate the latter, and then through the passage 28 to the crank case. It will thus be seen that in adapting a standard engine and standard hydraulic power transmitter to incorporate my invention, it is not necessary to provide any additional liquid circulating mechanism or any expensive parts or members. It is merely necessary to cut the grooves 22 and drill the various passages, whereby the liquid is prevented from escaping directly from the bearing 15 to the crank case, but is caused to flow partly by pressure and partly by centrifugal force to the interior of the transmitter, and the excess may lubricate the bearing in the transmitter and return to the crank case. The invention may thus be applied at very small expense.

It will of course be obvious that instead of the simple drilling of passages, piping may be provided to accomplish the desired result.

The shaft 13 may be provided with grooves 30 for preventing oil which may escape past the adjacent groove 22 from traveling along the shaft into the main casing 31 which encloses the hydraulic transmitter.

In my improved device the action of centrifugal force on the liquid in the working chamber formed by the passages 12, is in opposition to the action of centrifugal force on the liquid in the passage 25 which leads to the periphery of the working chamber. Thus very little pressure is required to deliver the oil to the passage 21 and from the latter through passages 23, 24 and 25, because centrifugal force acts on the liquid in the radial delivery passage of the casing wall to counterbalance the effect of centrifugal force on the liquid in the casing itself. The liquid enters the rotatable parts from the bearing of the shaft and escapes through the passage 28 which is in the shaft. The effect of centrifugal force is comparatively slight at the periphery of the shaft, and is nil at the center. The liquid will not escape past the bearing 29 when the parts are at rest, as the inlet is closed by the valve 27.

Having thus described my invention, what I claim as new and desire to secure by Letters Patent is:—

1. A hydraulic power transmitter having rotary driving and driven members provided with fluid passages, a fluid chamber including said passages, a shaft connected to one of said members, a bearing for said shaft, and connections between said bearing and the interior of said chamber for conducting oil from one to the other, said oil serving as the operating fluid for said transmitter, and for lubricating said bearing.

2. A hydraulic power transmitter having rotary driving and driven members provided with fluid passages, a fluid chamber including said passages, a crank shaft connected to one of said members, a bearing for supporting said crank shaft, and connections through said shaft between said bearing and the interior of said chamber for conducting oil from one to the other, said oil serving as the operating fluid for said transmitter, and for lubricating said bearing.

3. A hydraulic power transmitter having rotary driving and driven members provided with fluid passages, a fluid chamber including said passages, a crank shaft connected to said driving member, a bearing for supporting said crank shaft, and connections between said bearing and the interior of said chamber for conducting oil from one to the other, said oil serving as the operating fluid for said transmitter, and for lubricating said bearing.

4. A hydraulic power transmitter having rotary driving and driven members provided with fluid passages, a fluid chamber including said passages, a crank shaft connected to one of said members, a bearing for supporting said crank shaft, means for delivering lubricating oil to said bearing and connections between said bearing and the interior of said chamber at the outer periphery of the latter for conducting oil from said bearing to said chamber.

5. A hydraulic power transmitter including rotary driving and driven members provided with juxtaposed drive fluid passages, a shaft connected to one of said members, a bearing for supporting said shaft, and means for delivering lubricating oil to said bearing intermediate of its ends, said shaft having passages leading from the end portions of said bearing for conducting oil from said bearing, and said one of said members having a passage for conducting oil from said shaft passages to said drive fluid passages.

6. In combination an internal combustion engine having a lubricating system, a hydraulic power transmitter coupled to said engine, and means for conducting oil from said lubricating system to the interior of said transmitter to serve as the drive fluid of the latter.

7. In combination an internal combustion engine having a crank shaft, a crank case, and a lubricating system, a hydraulic power transmitter coupled to said shaft, means for conducting oil from said lubricating system to the interior of said transmitter, and means for returning oil from said transmitter to said crank case.

8. In combination an internal combustion engine having a crank case providing a crank shaft bearing, a crank shaft, and a lubricating system, a hydraulic power transmitter coupled to said shaft and including rotary driving and driven members with registering fluid circulating passages, means for conducting the oil from said crank case bearing to said passages, and means for returning oil from said passages to the engine crank case.

9. In combination an internal combustion engine having a main crank shaft, a bearing therefor, a hydraulic power transmitter including a rotatable casing secured to said crank shaft, and including a liquid impeller, a liquid driven member rotatably mounted within said casing, means for conducting lubricating oil from said bearing to the interior of said casing at the periphery of the latter, and means for returning oil from the center portion of said casing through said crank shaft to the engine crank case.

10. In combination a hydraulic power transmitter having a rotatable casing including a liquid impeller, a liquid driven rotary member within said casing, a shaft connected to said casing, a pair of passages extending lengthwise through said shaft, one of said passages being connected to the interior of said casing at the periphery thereof, and the other connected to said casing adjacent the center thereof.

11. In combination a hydraulic power transmitter including a casing provided with liquid impelling means therein, and an end wall opposite to said liquid impelling means, a liquid driven member within said casing, a shaft therefor having a bearing in said end wall, a shaft secured to said casing in alignment with said first mentioned shaft, and a pair of passages through said second mentioned shaft, one of them communicating with said bearing and the other communicating with the interior of the casing adjacent to the periphery thereof.

Signed at New York city, in the county of New York and State of New York this 31st day of January, A. D., 1925.

GUSTAV A. KLIMEK.